(12) United States Patent
Chan et al.

(10) Patent No.: US 7,289,801 B2
(45) Date of Patent: Oct. 30, 2007

(54) SYSTEM AND METHOD FOR USING RSSI TO INVOKE FEATURES OF A WIRELESS DEVICE

(75) Inventors: Chi Fai Chan, Laguna (HK); Hei Ming Tsang, Shatin (HK); Wai-Hung Leung, Shatin (HK)

(73) Assignee: VTech Telecommunications Limited, Hong Kong (HK)

( * ) Notice: Subject to any disclaimer, the term of this patent is extended or adjusted under 35 U.S.C. 154(b) by 306 days.

(21) Appl. No.: 10/338,006

(22) Filed: Jan. 8, 2003

(65) Prior Publication Data

US 2004/0203700 A1    Oct. 14, 2004

(51) Int. Cl.
*H04M 11/00*    (2006.01)
(52) U.S. Cl. .................. 455/421; 455/423; 455/424; 455/425; 455/422.1; 455/414.1
(58) Field of Classification Search ............... 455/424, 455/421, 67.11, 67.12, 67.13, 436, 456.1, 455/457, 414.1, 422, 414.2, 456.4, 456.5, 455/423, 422.1, 425
See application file for complete search history.

(56) References Cited

U.S. PATENT DOCUMENTS

| | | | |
|---|---|---|---|
| 5,243,641 A * | 9/1993 | Evans et al. | 455/465 |
| 5,574,775 A * | 11/1996 | Miller et al. | 455/444 |
| 5,940,746 A * | 8/1999 | Otting et al. | 455/161.3 |
| 5,991,901 A | 11/1999 | Mulford et al. | |
| 6,064,890 A * | 5/2000 | Hirose et al. | 455/513 |
| 6,138,024 A * | 10/2000 | Evans et al. | 455/452.2 |
| 6,219,549 B1 * | 4/2001 | Tat | 455/434 |
| 6,400,934 B1 * | 6/2002 | Calixte | 455/217 |
| 6,535,752 B1 * | 3/2003 | Dent | 455/574 |
| 6,556,822 B1 | 4/2003 | Matsumoto | |
| 6,631,264 B1 * | 10/2003 | Leickel et al. | 455/437 |
| 6,671,265 B1 * | 12/2003 | Hwang et al. | 370/331 |
| 6,799,059 B1 * | 9/2004 | Austin et al. | 455/561 |
| 2001/0018326 A1 * | 8/2001 | Link, II | 455/3.05 |
| 2003/0058922 A1 * | 3/2003 | Suwa | 375/133 |
| 2003/0139136 A1 * | 7/2003 | Pattabiraman | 455/41 |
| 2003/0194980 A1 * | 10/2003 | Peterson et al. | 455/226.1 |
| 2004/0063427 A1 * | 4/2004 | Narasimha et al. | 455/434 |
| 2004/0203362 A1 * | 10/2004 | Pattabiraman et al. | 455/41.2 |

FOREIGN PATENT DOCUMENTS

JP          20000332564          1/2000

OTHER PUBLICATIONS

GB Search Report dated May 18, 2004.

* cited by examiner

*Primary Examiner*—Rafael Perez-Gutierrez
*Assistant Examiner*—Khai Nguyen
(74) *Attorney, Agent, or Firm*—Paul, Hastings, Janofsky & Walker LLP

(57) ABSTRACT

A system and method for invoking one or more features of a wireless device when a signal strength of a channel approaches or drops below an RSSI threshold of the channel is disclosed. An embodiment of the invention includes the steps of (1) obtaining the RSSI threshold for the channel; (2) monitoring the signal strength during an operation mode of the wireless device; and (3) invoking the feature when the signal strength approaches a predetermined limit of the RSSI threshold. In an implementation on a cordless telephone, the feature can include playing a warning, switching to a different channel, or returning a telephone line to an idle state.

20 Claims, 4 Drawing Sheets

SYSTEM AND METHOD FOR USING RSSI TO INVOKE FEATURES OF A WIRELESS DEVICE

BACKGROUND

1. Field of the Invention

The present invention relates generally to wireless devices and, more particularly, to a system and method for using received signal strength indication (RSSI) to invoke one or more features of a wireless device.

2. Background of the Invention

Cordless telephones have many limitations. One of these limitations relates to problems associated with a handset being out of the range of communication with its base station. As a user communicates with another party using a handset while walking away from the base station, at some point the handset will be out of range and fail to perform. At this time, even though the handset has ceased operation, the base station continues to engage the telephone line. This results in a waste of telecommunications resources and the user might even pay for valuable air time that he does not use. Accordingly, there is a need for a cordless telephone that can intelligently detect the handset being out of range and return the telephone line to an idle state when the handset is out of range.

SUMMARY OF THE INVENTION

The invention provides a system and method that utilizes RSSI to invoke one or more features of a wireless device. One embodiment of the invention provides a method that saves an RSSI threshold associated with a channel of the wireless device; monitors a signal strength on the channel during an operation mode of the wireless device; and invokes a feature of the wireless device when the signal strength on the channel is within a predetermined limit of the RSSI threshold. A typical RSSI threshold can be about −100 dBm. Preferably, the predetermined limit is between about 100 percent and about 110 percent of the RSSI threshold. Preferably, the predetermined limit is about 105 percent of the RSSI threshold. The feature can involve one or more of playing a warning and changing to a different channel. The operation mode can involve a communications session using a telephone line associated with the wireless device, and the feature can include dropping the telephone line when the signal strength is below the RSSI threshold.

DETAILED DESCRIPTION OF THE INVENTION

Figure 1:
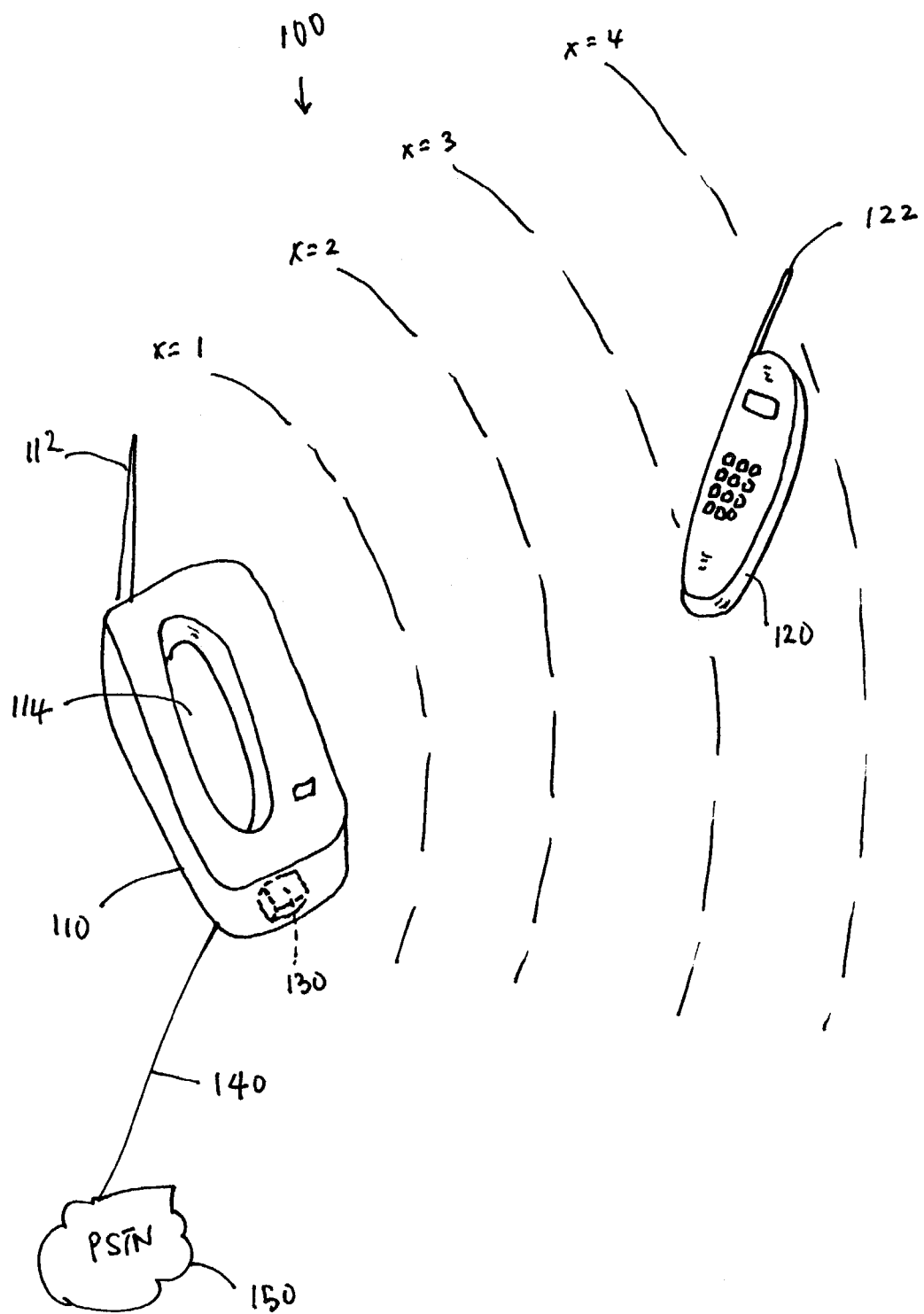
FIG. 1 is a schematic diagram showing a cordless telephone in accordance with an embodiment of the invention.

FIG. 1 is a schematic diagram showing a cordless telephone in accordance with an embodiment of the invention. Cordless telephone 100 includes base station 110, handset 120, and microprocessor 130. Microprocessor 130 resides within base station 110. An algorithm of the invention is preferably implemented on microprocessor 130. Although the preferred embodiment of the invention is implemented in a cordless telephone, the invention can be implemented in other wireless devices, including wireless telephones.

Base station 110 includes antenna 112 and cradle 114. Handset 120 includes antenna 122. Base station 110 is in an idle state when handset 120 is not being used. When handset 120 is away from cradle 114 and is being used by a user to make or receive a telephone call via telephone line 140 that is connected to PSTN 150, handset 120 communicates with base station 110 via RF signals. The RF signals are exchanged between handset 120 and base station 110 via antenna 122 and antenna 112.

RSSI (Received Signal Strength Indication) is an important aspect of cordless telephone design. A common unit for RSSI is dBm. RSSI is a signal output that is proportional with the RF input power. As a result, this signal output can be used to measure the RF signal strength on a specific channel and indicate the usage on that channel.

RSSI is typically higher when handset 120 is closer to base station 110. For example, in the absence of other environmental factors (e.g., signal interfering devices, physical obstructions, etc.) RSSI is directly proportional to the distance between handset 120 and base station 110. For example, the RSSI detected by base station 110 decreases as handset 120 moves away from base station 110. In other words, the RSSI at x=3 is lower than that at x=2, and the RSSI at x=2 is lower than that at x=1. At some point, for example, when handset 120 is at x=4 or farther away from base station 110, RSSI becomes so low that an effective communication between handset 120 and base station 110 can be not established. At x=4 and beyond, handset 120 is considered to be out of range.

Many features of cordless telephone 100 can be implemented using the RSSI information. Conventionally, each cordless telephone is associated with an RSSI threshold, which can be quite difficult to determine. Traditionally, the RSSI threshold is preset at the factory. The factory preset RSSI threshold is frequently less than optimal for the cordless telephone when used by a user at home. The present invention provides a method that determines a reliable RSSI threshold. For the purpose of describing the invention depicted in FIG. 1, the RSSI threshold for cordless telephone 100 at the current channel is the RSSI measured at x=4.

Figure 2:
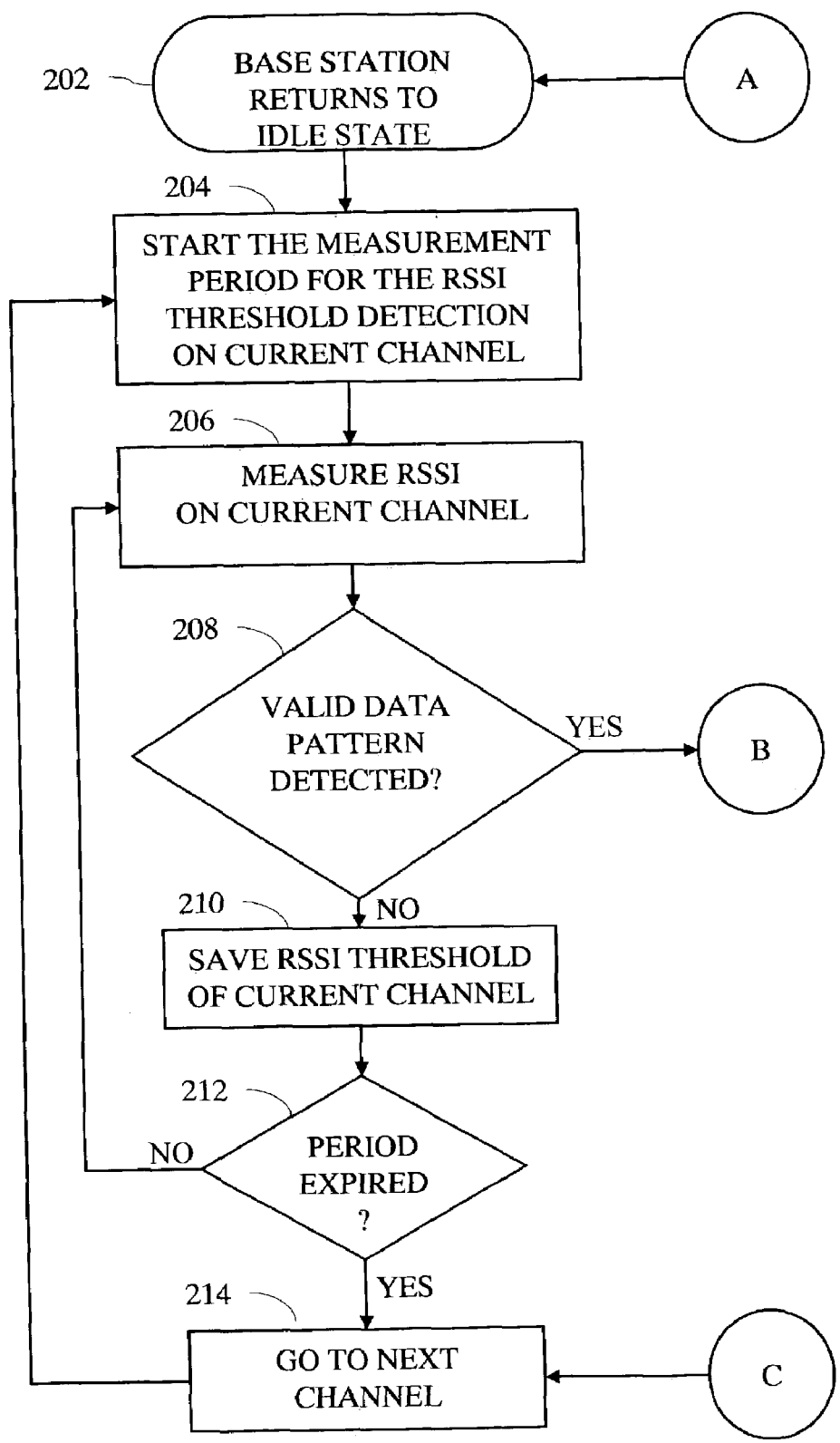
FIGS. 2 and 3 are collectively a flowchart showing an exemplary process of the invention.
Figure 3:
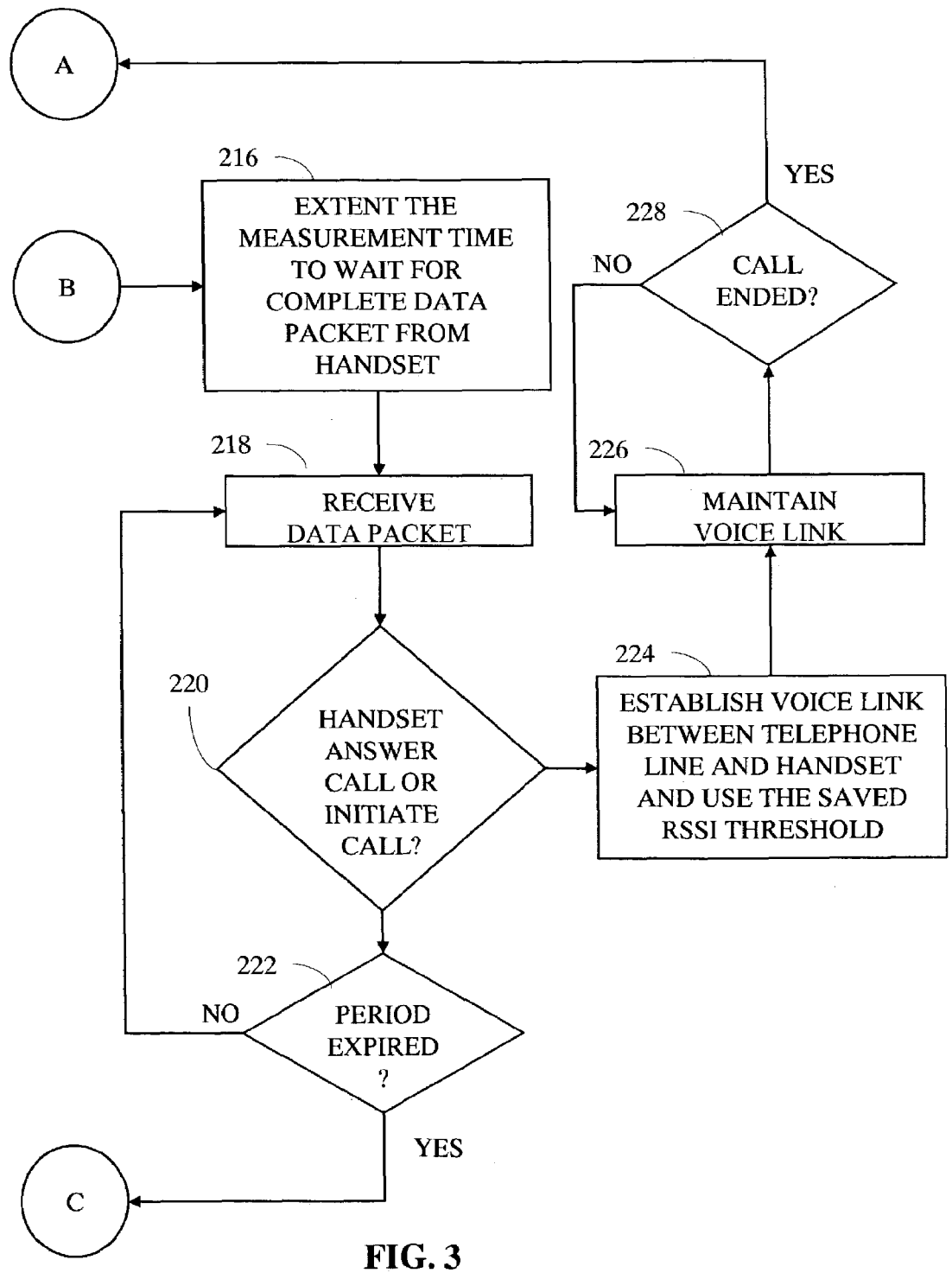

FIGS. 2 and 3 are collectively a flowchart showing an exemplary process of the invention. For clarity, references are made to FIG. 1. In the preferred embodiment, microprocessor 130 is configured to perform one or more steps described below.

In step 202, base station 110 returns to an idle state. Base station 110 can return to the idle state in one of several ways. For example, base station 110 is in the idle state after cordless telephone 100 finishes a startup initiation, when telephone line 140 is not being used to communicate, and where there is an unanswered call. It is not necessary to remove handset 120 from cradle 114.

In step 204, a measurement period for the RSSI threshold detection on a current channel is started. A typical cordless telephone is associated with 30 channels one of which is used at a time for communication between the handset and the base station. The measurement period can be, for example, about 20 milliseconds. The measurement period is used to monitor (1) the background RF signal strength; and (2) the valid data signal from handset 120 on the current channel.

In step 206, the RF signal strength on the current channel is measured. Measurement of RF signal strength is generally known and is, therefore, not further described herein.

In step 208, it is determined whether any valid data pattern from handset 120 is detected. If so, the process goes to step 216 (shown in FIG. 3). Otherwise, the process goes to step 210.

In step 210, if no valid data pattern from handset 120 was detected in step 208, the measured signal strength of the current channel is saved as the RSSI threshold for the current channel. Preferably, the RSSI threshold for the current channel is stored in a memory accessible to microprocessor 130.

In step 212, if the measurement period set in step 204 has not expired, the process returns to step 206. Otherwise, the process goes to step 214.

In step 214, another channel is selected and the process repeats steps 204 through 214 for each available channel. For example, this process can be repeated 30 times if cordless telephone 100 has 30 channels.

In step 216 (FIG. 3), if valid data pattern from handset 120 was detected in step 208, the measurement period set in step 204 is extended. The extension can include, for example, two 50-millisecond periods totaling 100 milliseconds. Therefore, the new measurement period in step 216 can be about 120 milliseconds long.

In step 218, base station 110 receives the data packet from handset 120.

In step 220, if handset 120 enters into an operation mode, i.e., to answer an incoming call or to initiate an outgoing call, the process goes to step 224. Otherwise, the process goes to step 222.

In step 222, it is determined whether the extended measurement period has expired. If so, the process goes to step 214 (FIG. 2) for measurement on another channel. Otherwise, the process repeats steps 218 through 222 until the extended measurement period has expired.

In step 224, if handset 120 is used, e.g., to answer or initiate a call, a communications session between handset 120 and base station 110 is established to enable a voice link with another party on telephone line 140. The voice link uses the most recently saved RSSI threshold for the current channel.

In step 226, the voice link is maintained.

In step 228, it is determined whether the call has ended. If so, the process returns to step 202 (FIG. 3). Otherwise, the process repeats steps 226 and 228.

Accordingly, the invention is configured to define different RSSI thresholds on different channels. For a cordless telephone that has 30 channels, as many as 30 different RSSI thresholds can be saved. By implementing a process of the invention, such as that illustrated in FIGS. 2 and 3, the best RSSI threshold that takes into consideration the environmental information can be saved for each channel. This process is superior to setting the RSSI threshold at the factory.

The present invention provides other advantages. For example, the invention saves the production time of the cordless telephone by neglect the tuning of the RSSI threshold at the factory. In turn, a saving in production time can result in a saving in production cost. In addition, due to its measurement of RSSI threshold at the location when the cordless telephone is used, the invention provides RSSI information that is more reliable, which results in increased performance of the cordless telephone.

The RSSI threshold measured and saved in accordance with the present invention can be used in many ways. For example, the RSSI threshold can be used to invoke one or more features of cordless telephone 100.

For example, the RSSI threshold measured for each channel can be used for out of range detection for the channel in use. Referring to FIG. 1, for example, as handset 120 moves away from base station 110 to a location between x=3 and x=4, a warning can be played by handset 120 to alert the user that it is approaching the out of range limit. The warning can be an audible tone and/or a visible indication produced by handset 120. Further, when handset 120 moves away from base station 110 to a location where x is greater than 4, microprocessor 130 can immediately return telephone line 140 to an idle state, resulting in a saving in telecommunications resources.

Figure 4:
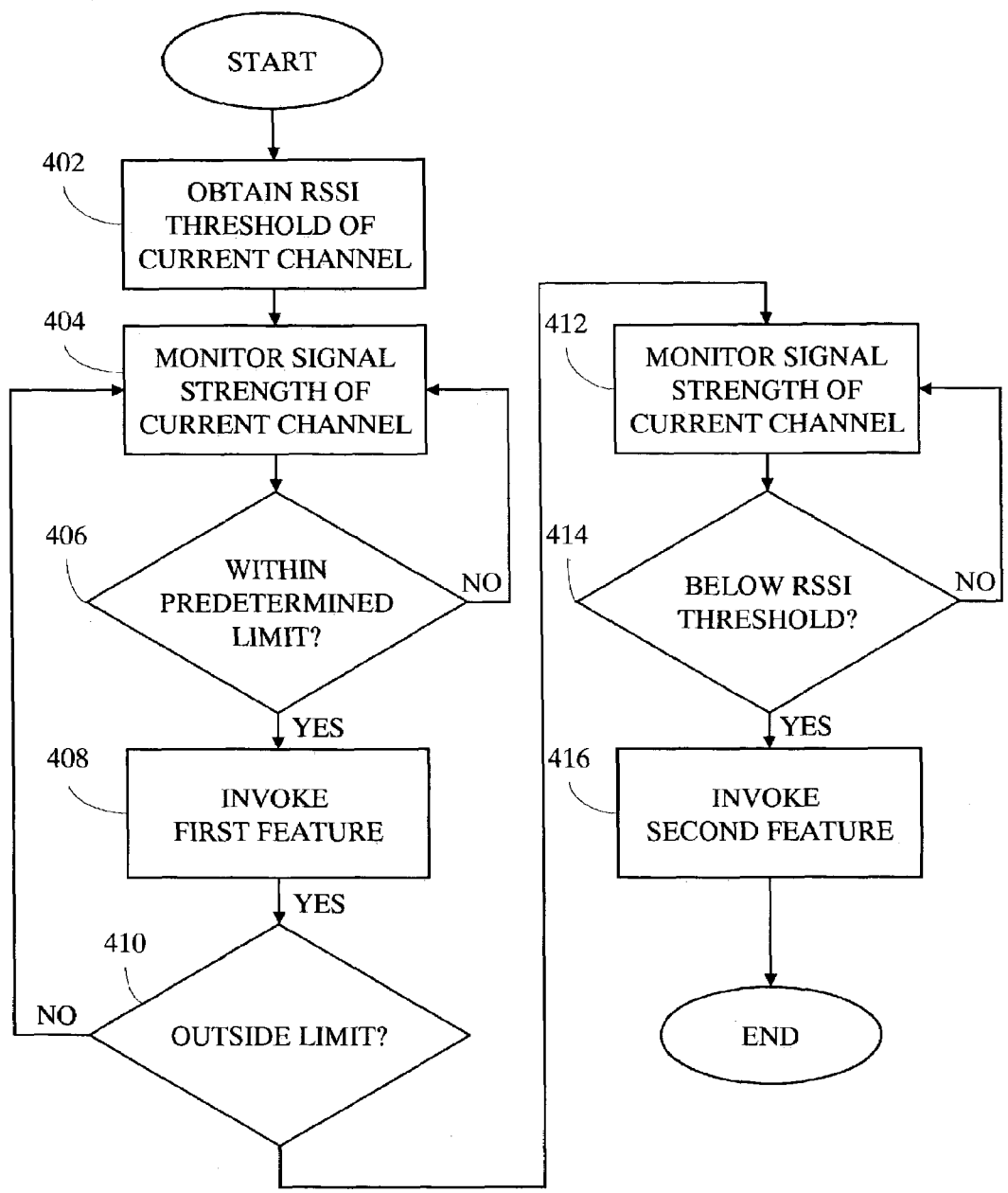
FIG. 4 is a flowchart showing an exemplary process involved in using a cordless telephone of the invention.

FIG. 4 is a flowchart showing an exemplary process involved in using a cordless telephone of the invention. For clarity, cordless telephone 100 shown in FIG. 1 is referenced herein.

In step 402, an RSSI threshold is obtained for a current channel of cordless telephone 100. Preferably, an RSSI threshold is obtained for each channel of cordless telephone 100. For example, if cordless telephone 100 has 30 channels, an RSSI threshold is obtained for each of the 30 channels. As a result, there are a total of 30 RSSI thresholds. Depending on factors associated with each channels, two or more of these RSSI thresholds may be identical. The RSSI thresholds can be obtained in accordance with the exemplary process shown in FIGS. 2-3.

In step 404, during an operation mode of handset 120 (e.g., handset 120 is being used during a telephone call on telephone line 140), a signal strength of the current channel (the channel being used) is monitored. Preferably, the signal strength of the current channel is compared with the RSSI threshold of the current channel.

In step 406, if the signal strength measured in step 404 is within a predetermined limit of the RSSI threshold, the process goes to step 408, otherwise, the process returns to step 404. The predetermined limit can be, for example, between about 100 percent and 110 percent of the RSSI threshold. In other words, if the RSSI threshold is −100 dBm, then the predetermined limit would be between −100 dBm and −110 dBm. Preferably, the predetermined limit is about 105 percent of the RSSI threshold (i.e., the limit is −105 dBm if the RSSI threshold is −100 dBm).

In step 408, a first feature of cordless telephone 100 is invoked. The first feature can be one of several possibilities. The first feature can include playing a warning at handset 120. The warning can be either an audible tone or a visible clue, or both. The first feature can also include switching to a different channel having a lower RSSI threshold. The first feature can also be dropping the telephone call altogether.

In step 410, if the signal strength of the current channel is outside the predetermined limit of the RSSI threshold of the current channel, the process returns to step 404. Otherwise, the process goes to step 412. For example, the process can return to step 404 when the user of handset 120 walks closer to base station 110 resulting in an increase in the signal strength (e.g., greater than −110 dBm). Alternatively, the process can return to step 404 when a channel having a higher RSSI threshold is used.

In step 412, the signal strength of the current channel continues to be measured and compared against the RSSI threshold.

In step 414, if handset 120 has gone out of range, e.g., the measured signal strength has dropped below the RSSI threshold (i.e., lower than −100 dBm), the process goes to step 416. Otherwise, the process repeats step 412.

In step 416, a second feature is invoked. The first feature can be one of several possibilities. The second feature can include switching to a different channel having a lower RSSI threshold. The second feature can also be dropping the telephone line altogether.

In another embodiment in which only one feature is to be invoked, the process can go from step 402 directly to step 412. For example, the invention can be implemented on a cordless telephone that has an external charger for the handset to save valuable resources. During a conventional usage, if a user wants to hang up a telephone call, the user can either press a button, e.g., the "Phone Off" key or put the handset on the external charger. If the RF environment is not desirable, i.e., due to a long range between the handset and the base station, or if there is an interference emitted by other electronic equipment, the base station cannot receive any signal from the handset and the base station continues to engage in the call. Under those circumstances, the user would not know that the base station is still engaged in the call, resulting in a waste of telecommunications resources. One function of this invention is to prevent or reduce the wasted call time.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   measuring an RSSI signal associated with a channel of a wireless device, wherein the wireless device comprises a handset and a base station;
   saving the RSSI signal as an RSSI threshold associated with the channel of the wireless device when a valid data pattern is not received in a transmission between the handset and base station, wherein effective communication cannot be established when the RSSI signal is at or below the RSSI threshold;
   monitoring a signal strength on the channel during an operation mode of the wireless device from the base station, wherein the operation mode involves a communications session using a telephone line associated with the wireless device; and
   invoking a feature of the wireless device when the signal strength on the channel is within a predetermined limit of the RSSI threshold.

2. The method of claim 1, wherein the predetermined limit is between substantially 100 percent and substantially 110 percent of the RSSI threshold.

3. The method of claim 1, wherein the predetermined limit is substantially 105 percent of the RSSI threshold.

4. The method of claim 1, wherein the feature involves playing a warning.

5. The method of claim 1, wherein the feature includes a change to a different channel.

6. The method of claim 1, further comprising dropping the telephone line when the signal strength is below the RSSI threshold.

7. A method comprising:
   measuring an RSSI signal associated with a channel of a wireless device, wherein the wireless device comprises a handset and a base station and wherein the base station performs the measuring an RSSI signal associated with a channel of a wireless device;
   storing the measured RSSI signal as an RSSI threshold in a memory of the wireless device when a valid data pattern is not received in a transmission between the handset and base station, wherein effective communication cannot be established when the RSSI signal is at or below the RSSI threshold;
   comparing a signal strength on the channel to the RSSI threshold during an operation mode of the wireless device, wherein the operation mode involves a communications session using a telephone line associated with the wireless device; and
   invoking a feature of the wireless device when the signal strength approaches the RSSI threshold.

8. The method of claim 7, wherein the feature includes playing a warning that the signal strength is approaching the RSSI threshold.

9. The method of claim 7, further comprising saving an RSSI threshold associated with each channel of the wireless device.

10. The method of claim 9, wherein the feature includes changing to a different channel having a lower RSSI threshold.

11. The method of claim 7, further comprising invoking a second feature of the cordless telephone when the signal strength is below the RSSI threshold.

12. The method of claim 11, wherein the second feature includes returning a telephone line associated with the wireless device to an idle state.

13. The method of claim 7, wherein the wireless device is a cordless telephone.

14. A cordless telephone comprising:
   a handset;
   a base station; and
   a microprocessor, wherein the base station comprises the microprocessor and
   wherein the microprocessor is configured to:
   determine whether a valid data pattern is transmitted between the handset and the base station;
   obtain an RSSI threshold associated with a channel of the cordless telephone, the RSSI threshold being an RSSI signal measured when a valid data pattern is determined to have not been transmitted wherein effective communication cannot be established when the RSSI signal is at or below the RSSI threshold;
   store the RSSI threshold in a memory of the cordless telephone;
   monitor a signal strength on the channel of the cordless telephone during an operation mode of the handset, wherein the operation mode involves a communications session using a telephone line associated with the wireless device; and
   invoke a feature of the cordless telephone when the signal strength approaches within a predetermined limit of the RSSI threshold.

15. The cordless telephone of claim 14, wherein the predetermined limit is between substantially 100 percent and substantially 110 percent of the RSSI threshold.

16. The cordless telephone of claim 14, wherein the predetermined limit is substantially 105 percent of the RSSI threshold.

17. The cordless telephone of claim 14, wherein the feature includes playing a warning.

18. The cordless telephone of claim 14, wherein the microprocessor is configured to obtain a second RSSI threshold of a second channel.

19. The cordless telephone of claim 18, wherein the feature includes switching to the second channel if the second RSSI threshold is lower than the first RSSI threshold of the first channel.

20. The cordless telephone of claim 14, wherein the feature includes dropping a telephone line when the signal strength is below the RSSI threshold.

* * * * *